United States Patent [19]

Cornair et al.

[11] 3,805,630
[45] Apr. 23, 1974

[54] DRILL PRESS FEED UNIT
[75] Inventors: Russell J. Cornair, Bath, Ohio; Warren T. Nishida, Los Angeles, Calif.
[73] Assignee: International Basic Economy Corporation, New York, N.Y.
[22] Filed: Feb. 14, 1972
[21] Appl. No.: 226,054

[52] U.S. Cl............. 74/89.21, 74/240, 408/135
[51] Int. Cl............................................. F16h 27/02
[58] Field of Search .......... 408/135, 130; 74/89.21, 74/240

[56] References Cited
UNITED STATES PATENTS
| 3,672,237 | 6/1972 | Nagin | 74/89.21 |
| 3,147,853 | 9/1964 | Van Huis | 74/240 |
| 2,625,844 | 1/1953 | Beckett et al. | 408/135 |
| 2,718,153 | 9/1955 | Dean | 74/240 |
| 3,698,826 | 10/1972 | Henderson | 408/130 |
| 3,704,074 | 11/1972 | Deschner | 408/130 |

Primary Examiner—Samuel Scott
Assistant Examiner—Wesley S. Ratliff, Jr.
Attorney, Agent, or Firm—Alan N. McCartney

[57] ABSTRACT

In a drill press, of the type having a rotary drill mounted on a quill that is moved reciprocally by a rack and pinion mechanism, a feed unit comprising an air driven piston prime mover, a contained belt attached thereto to transmit the rectilinear motion to a pinion for transfer to rotary motion, an intermediate shaft and clutch for attaching the rotating pinion to the drill press rack and pinion mechanism, and a cam drum, driven by the intermediate shaft, for controlling the drilling operations.

7 Claims, 8 Drawing Figures

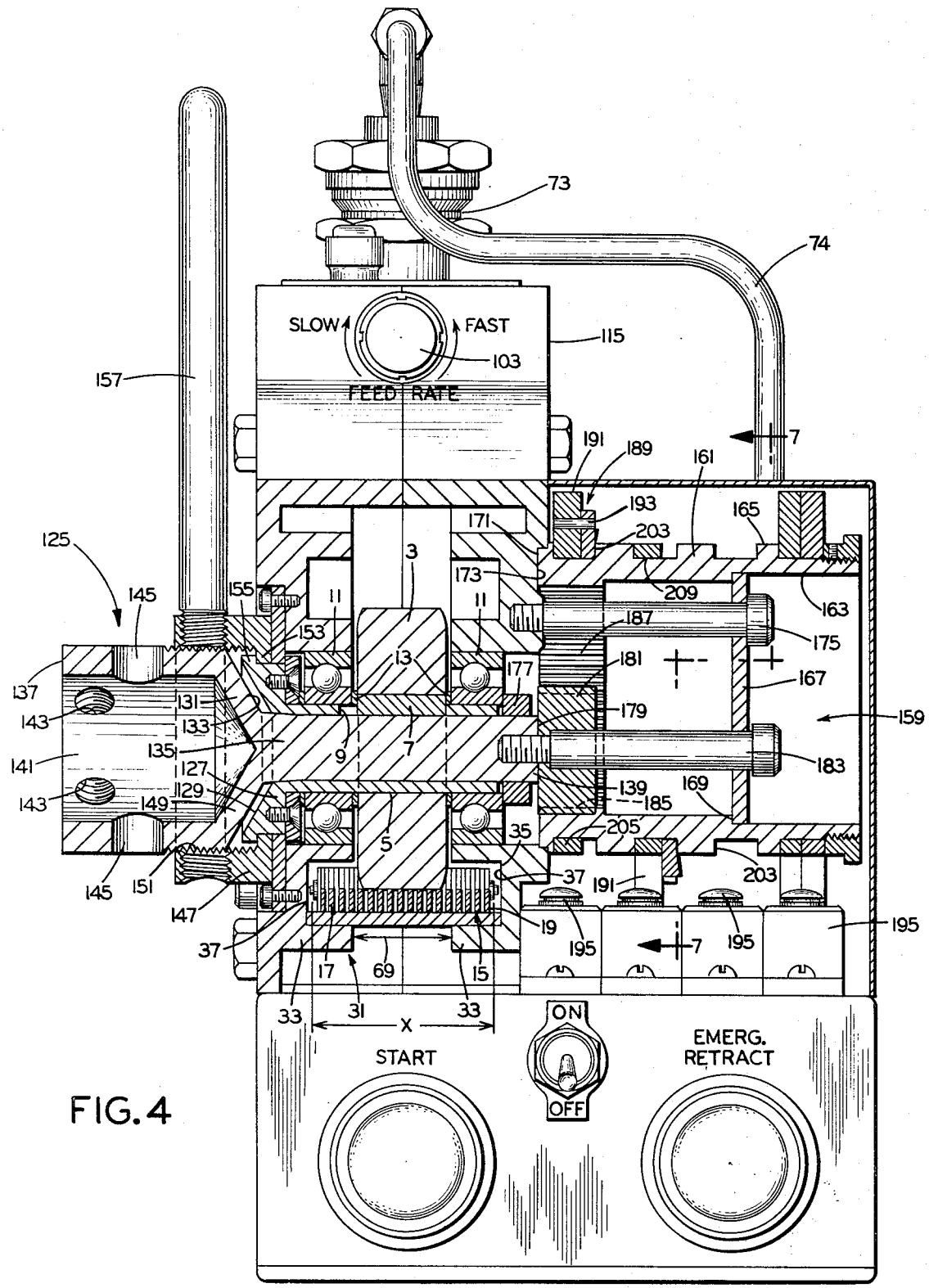

DRILL PRESS FEED UNIT

DESCRIPTION OF THE PRIOR ART

Drive units are known and used for drill presses, especially drill presses comprising a vertically oriented quill, that itself comprises a rotating shaft, chuck, and drill, that is moved vertically toward and away from a work piece positioned directly below the drill through a rack and pinion-type drive from which emerges a spindle or star wheel shaft. These feed units provide increased drilling accuracy and drill feed rate over hand-feeding; increased production, reduced manpower per drilled unit, increased drill quality, extended drill and tool life, and also provide for multiple operations of a reiterated nature.

Conventional drill press feed units generally comprise a rack and pinion drive operably connected to the star wheel shaft where the rack is an extended rigid arm with teeth that engage the pinion connected to the star wheel shaft, the rack being advanced and retracted through a rectilinear fluidic drive motor such as an air motor-piston assembly. In most cases, the star wheel shaft turns a maximum of 360° to complete drilling operations on the work piece (positioned below the drill); however, there are numerous instances where it is desired to advance the star wheel shaft more than one turn, i.e., greater than 360°. On conventional feed units the rack must be extended to provide more teeth to turn the pinion a greater number of degrees and such increased length causes crowding with nearby equipment and machinery. The extended rack also shifts the weight of the overall feed unit sufficiently to encounter problems of unwanted torque and bending. Depending upon the position of the quill and star wheel shaft in its upwardly retracted position, and the position and distance from the drill tip to the work piece positioned therebelow, conventional rack and pinion type feed units require tilting from horizontal to provide proper programming of drilling operations. Tilting the feed unit introduces tortional stresses that require additional maintenance and shorten the life of the unit.

Further, many of the extended rack and pinion type drive mechanisms are programmed for initiating various drilling operations by positioned lock nuts on or in communication with the rack. The lock nuts many times loosen due to vibration and reposition themselves thereby causing the feed unit to depart from the preset sequence.

The drill press feed unit of this invention is designed to substantially lessen and, in many cases, eliminate the aforedescribed problems. In one embodiment, the feed unit is much compacted or shortened over existing drive units and is also significantly shorter in total length per the amount of star shaft rotation desired in the programmed sequence. The unit is of lesser weight than prior art feed units and does not encounter the tortional and bending problems that are associated with present day units. Further, the drive unit of this invention may always be positioned horizontal to the working surface to eliminate many of the problems associated with tilted feed units. In addition, the star wheel drive shaft may be programmed to rotate more than one revolution during the drilling cycle. These benefits are accomplished inter alia by eliminating racks and associated locking nuts in favor of positionable and adjustable cam lobes on a drum-shaped programming device in combination with a flexible, rectilinear drive unit.

Therefore, the main object of this invention is a compact and overall shortened drill press feed unit that provides a significantly greater degree of star wheel shaft rotation per unit length of the unit than feed units of the prior art. Other objects include a highly compact and lightweight drill press feed unit that may be employed on virtually any drill press of the type that comprises a rotating drill attached to or mounted on a quill that is moved reciprocally through a rack and pinion type drive mechanism. Further objects include a drill press feed unit that is more easily and accurately programmed for drilling operations than prior art devices and whose settings will not change with vibration or other deleterious factors encountered in the operation thereof. These and other objects will become more apparent upon reading the following description of the preferred embodiment in conjunction with the drawings appended hereto.

DESCRIPTION OF THE DRAWINGS

FIG. 4 is an end view, partially in section, taken along the lines 4—4, of the embodiment of the drill press feed unit shown in FIG. 3.

SUMMARY OF THE INVENTION

In a drill press, of the type having a rotary drill mounted on a quill that is moved reciprocally by a rack and pinion mechanism, a feed unit comprising a rectilinear prime mover, a first means operably connected thereto for deriving rotary motion from rectilinear motion and including a substantially non-compressible contained belt; a second means connecting the first means to the drill press rack and pinion mechanism including a clutch for orienting the feed unit; and programming means connected thereto for controlling the drilling operations as a function of the rotation of the drill press rack and pinion mechanism.

DESCRIPTION OF THE PREFERRED EMBODIMENTS:

One embodiment of the feed unit is shown in the figures; this embodiment comprises a rectilinear prime mover, a first means for deriving rotary motion from rectilinear motion, a second means for connecting the first means to the drill press, and a programming means operably connected thereto for controlling the sequence and duration of the drill press drilling operations. Each of these components will be explained in detail.

Figure 3:
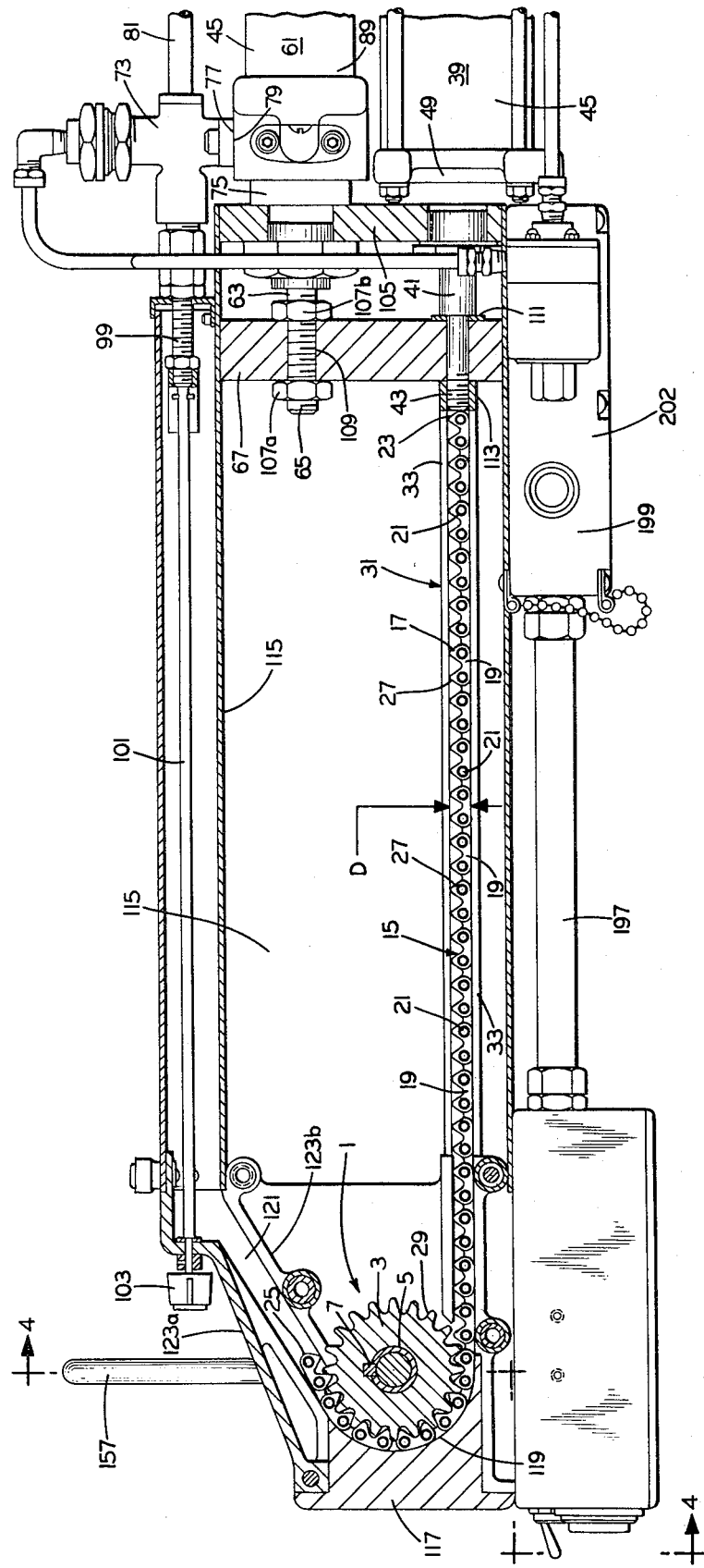
FIG. 3 is an expanded side view, partially in section, of the front half of the embodiment of the drill press feed unit shown in FIG. 1.

As shown in FIGS. 3 and 4, the first means for deriving rotary motion from rectilinear motion is termed a "rotary motion transfer means" and is generally indicated at 1. It comprises a pinion or gear wheel 3 mounted on a hollow shaft or sleeve 5 and fastened thereto by a pinion key or wedge 7 that engages an elongated slot 9 on sleeve 5. The elongated slot 9 permits some lateral or reciprocal movement of sleeve 5 with respect to pinion 3. Sleeve 5 and pinion 3 are supported for rotation by a pair of bearings or ball races 11 spaced from pinion 3 by thrust washers 13. Pinion 3 is powered by tangential contact with a discontinuous (i.e., non-joined) contained belt, generally indicated at 15, which in this particular embodiment comprises a flat metal chain 17 of a width X greater than its depth D and formed by a plurality of links 19 which are interconnected by pins 21 to form a flexible, substantially non-compressible drive belt having ends 23 and 25. Chain 17 has teeth 27 formed on at least one side thereof that mate with teeth 29 that are formed about the surface of pinion 3.

Chain 17 is not joined into a continuous loop but is held in a fixed configuration, preferably rectilinear, by guiding and containing means 31 which, in this particular embodiment, comprise a pair of C-shaped channels 33 having concave portions 35, formed by surfaces 37, that are in parallel relationship, face each other, and traverse almost the complete rectilinear length of chain 17. Concave portions 35 slidingly enclose the edges and outer portions of the top and bottom surfaces of flat chain 17 permitting it to slide therealong yet preventing it from grossly flexing or bending out of its fixed configuration. Thus, force exerted at one end of chain 17 is transmitted without loss to the other end.

Figure 2:
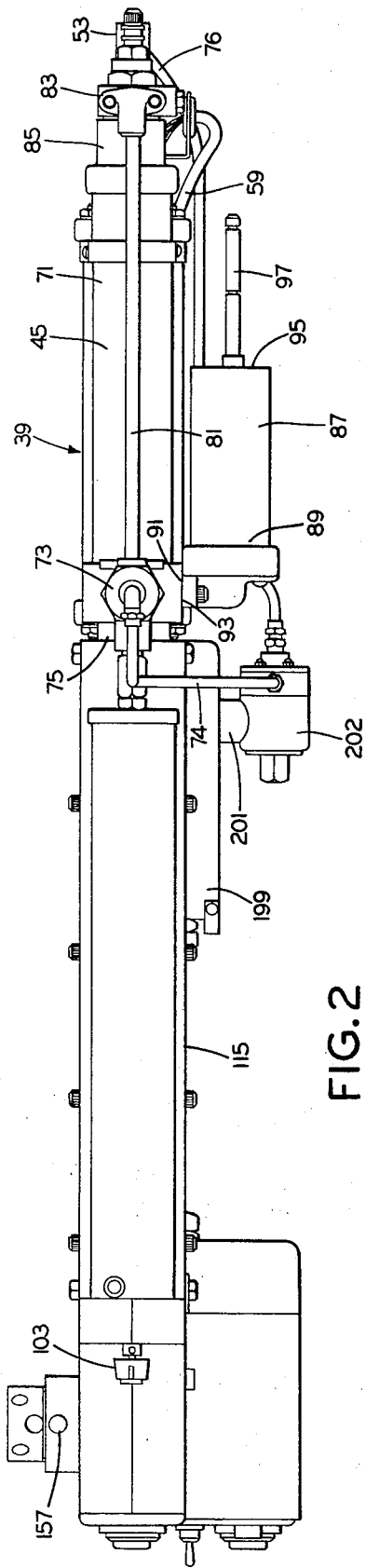
FIG. 2 is a top view of the same embodiment of the drill press feed unit shown in FIG. 1.
Figure 1:
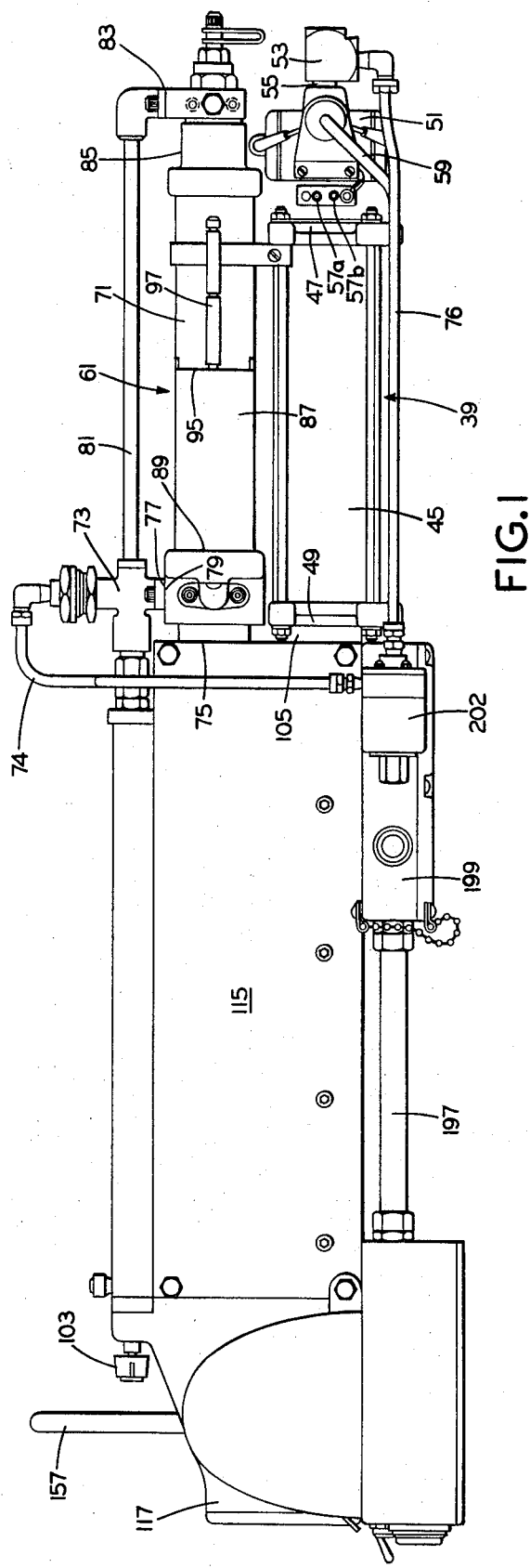
FIG. 1 is a side view of one embodiment of the drill press feed unit of this invention.

Connected to end 23 of chain 17 and aligned substantially axial to the major axis of contained belt 15 is rectilinear prime mover means 39. Means 39 may be any form of rectilinear reciprocating driving means; shown in FIGS. 1, 2 and 3 is an embodiment comprising a piston rod 41 that is connected at its exposed end 43 to belt end 23, a cylinder 45, having ends 47 and 49, in which piston rod 41 reciprocates through the action of net fluidic pressure applied on either side of a piston (not shown) slidingly mounted therein and attached to the opposite (non-exposed) end of piston rod 41 and in fluid-sealed communication with the interior wall of cylinder 45. In fluid communication with cylinder end 47 is a four-way fluid control valve 51 which is fed pressurized fluid (from an external source) through inlet 53 and transport duct 55. Control valve 51, upon command, passes pressurized fluid into cylinder end 47 or into end 49, the latter via an external duct (not shown). The flow rate in either direction of pressurized fluid through valve 51 may be controlled by adjustable needle valves 57a and 57b that are interposed between valve 51 and cylinder end 47. Motivating power to valve 51 in the form of electrical signals or other energy pulses is transmitted from programming and command circuitry (to be described later) through conduits 59.

Optionally combined with rectilinear prime mover means 39, but highly preferred for quality control considerations is a hydraulic speed control unit generally indicated at 61. This unit comprises a hydraulic resistance flow circuit and, in the particular embodiment shown in FIGS. 1, 2 and 3 comprises a piston rod 63 having an exposed end 65 and arranged for parallel movement with rectilinear prime mover piston rod 41 through a parallel drive member 67. C-shaped channels 33 are spaced apart to form a passageway 69 through which drive member 67 travels during movement of chain 17. Piston rod 63 is adapted for reciprocal movement in speed control cylinder 71 by a piston (not shown) slidingly mounted therein attached to the non-exposed end of rod 63 (not shown). A closed hydraulic loop is formed about speed control cylinder 71 through a hydraulic resistance and poppet valve 73, in fluid communication with the front end 75 of cylinder 71, through mating interfaces 77 and 79 and through a hydraulic duct 81 and associated fittings 83 to the opposite end 85 of speed control cylinder 71. The closed hydraulic loop also contains a hydraulic extension in the form of reservoir or balance cylinder 87 whose front end 89 is in fluid communication with speed control cylinder front end 75 through mating interfaces 91 and 93. From the closed rear end 95 of balance cylinder 87 emerges a piston rod 97 that is adapted for reciprocal motion in cylinder 87 by a piston (not shown) slidingly mounted therein attached to the non-exposed end of rod 97 (not shown). Piston rod 97 is biased to move toward end 89 through a coil spring (not shown) about piston rod 97 located between the inner surface of end 95 and the piston. Thus, the closed hydraulic loop is maintained substantially airtight and pressurized by the force of biased piston and piston rod 97 in balance cylinder 87.

Hydraulic resistance and poppet valve 73 contains the combined functions of controllable minute fluid flow from cylinder end 75 to duct 81 (and vice versa) and, upon command, enlarged fluid flow. The restricted flow is controlled by a needle valve therein (not shown) that may be adjusted by turning a valve stem 99, extending from one side of valve 73, that is extended to the front of the feed unit by extension rod 101 and dial 103. The enlarged fluid flow is controlled by a poppet valve assembly (not shown) located in valve 73 that may be activated by air pressure or vacuum to shunt fluid through interior bypass ports. The poppet action of valve 73 is controlled by a valve 202 connected thereto by conduit 74 through fluid pressure from source 53 via conduit 76.

When rectilinear prime mover means 39 is commanded to drive piston rod 41 from cylinder 45 so as to apply compressive rectilinear force against chain 17 and turn pinion 3 to advance the rotating drill against the work piece, hydraulic speed control piston rod 63 is pulled out of cylinder 71 by the direct action of piston rod 41 acting through parallel drive member 67. Hydraulic fluid in front of the piston in cylinder 71 attached to piston rod 63, i.e., between the piston and cylinder front end 75, is forced, by the advancing piston through the needle valve orifice in hydraulic resistance and poppet valve 73 into hydraulic duct 81 where it travels to cylinder rear end 85 and in behind the moving piston. The resistance to fluid flow at the orifice in valve 73 reduces the forward motion of piston rod 41 from cylinder 45 so as to controllably slow and smooth out the movement of said prime mover means 39 and thus, the travel of the rotating drill toward the work piece. This controlled rate of travel is termed the "drill feed rate".

When "skipping" is desired, i.e., a rapid advance or retraction of the rotating drill from one drilling position to another, the poppet valve assembly in valve 73 is commanded to open bypass ports therein to permit a significantly greater rate of hydraulic fluid flow therethrough thus permitting more rapid movement of piston rod 41 into or out of cylinder 45. Piston rod 97 and the attached piston, under bias force, fluctuates in and out of balance cylinder 87 is response to changes in fluid volume of the hydraulic fluid circuit or loop. These changes in volume result from leakage of hydraulic fluid from the circuit components and from movement of the piston attached to hydraulic speed control piston rod 63 within cylinder 71.

Rectilinear prime mover means 39 is known in the art and does not form a novel component per se of the present invention. Likewise, hydraulic speed control 61 and its associated components are known in the art and do not form a novel component per se of the invention.

In the embodiment shown in FIGS. 1,2&3 rectilinear prime mover means 39 and hydraulic speed control 61 are conventionally mounted for parallel reciprocating motion on a common base 105. Likewise, hydraulic speed control piston rod 63 is conventionally fastened to parallel drive member 67 by opposed mounting nuts 107a and 107b that are threadably engaged to piston rod end 65 on both sides of a bore hole 109 in parallel drive member 67 through which rod 63 is positioned. Rectilinear drive means piston rod 41 is fastened to parallel drive member 67 and to belt end 23 in a conventional manner that includes a thrust washer 111 interposed a ridge on piston rod 41 and the adjacent surface of parallel drive member 67, and a chain block 113 on chain end 23 to which piston rod end 43 is threadably mated on the opposite side of drive member 67. This particular mounting arrangement permits hydraulic speed control 61 to act in direct conjunction with rectilinear drive means 39 and also locates these fluidic components at the rear end of the drive unit, out of proximity to the drill press quill and related components.

Parallel drive member 67, contained belt 15, and guiding and containing means 31 are contained in a distortion resistant torque tube 115 that is sealed against entrance of dust at its rear end by base 105 and at its fore end by the command and control containing portion of the feed unit.

The novelty of contained belt 15 in combination with rectilinear prime mover means 39 and rotary motion transfer means 1 is that belt 15 does not continue past the drill press star wheel shaft but is turned back upon itself thereby eliminating the aforementioned problems due to overtravel of the threaded set nut shafts and fixed racks and due to the excessive lengths of present feed units.

A bearing shoe 117 comprising a rigid block with a concave bearing surface 119, that conforms to the curve of pinion 3, is juxtaposed to the chain-contacting surface of pinion 3 to bring chain 17 into extended contact with pinion 3 and to fold chain 17 back upon itself. A take-up slot 121 is formed above pinion 3 by opposing webs 123a and 123b for containing chain 17 after it passes out of contact with pinion 3.

In contrast to the extended length of prior art feed units, due to overtravel of the fixed rack, the length of the feed units of this invention are only half as long because the belt is folded back upon itself after passing the pinion. This savings in overall length not only reduces the cost of the unit, but minimizes many of the unwanted stresses and strains brought about by the heretofore long racks.

Although chain 17 is the preferred embodiment of contained belt 15, a wide variety of substantially non-compressible flexible strips of material are contemplated herein such as flexible metal tapes and flexible strips of plastic and rubber material such as nylon cord, extruded flexible polyethylene cable, rubber drive belts, etc. The requirements for such a belt are that it should be sufficiently non-collapsible (adequate column strength) under compression although some unavoidable collapsing is expected and accepted to provide accurate rotary motion to transfer means 1 (for skipping and drill feeding), be sufficiently strong and nonelastic under tension (adequate tensile strength) to impart accurate opposite rotary motion to means 1 (for retraction), and be capable of bending at least 90° and preferably 180° for take-up after contact with means 1. The cross-sectional shape of contained belt 15 is not limited; it may be round, such as a cable, or square, such as a bicycle chain, or trapezoidal such as the popular Gilmer timing belt. Therefore, as used herein, the term "belt" means non-compressible flexible strips of a wide variety of cross-sectional shapes.

Guiding and containing means 31 may take a variety of forms, depending to some extent upon the cross-sectional shape and desired configuration of contained belt 15. Contemplated forms of means 31 include a rigid tube through wich belt 15 may pass, opposed unyielding surfaces on either top and bottom or side and side or both of belt 15, etc.

Rotary motion transfer means 1 is connected to the drill press star wheel drive shaft through adjustable positioning drive means 125 shown in FIGS. 3 and 4. Means 125 comprises a first clutch plate 127 and face 129 formed in sleeve 5 so that is is axially connected to pinion 3. The elongated slot 9 in sleeve 5 permits slight reciprocal movement of clutch face 129. A second clutch plate 131 and face 133 is formed in an intermediate shaft 135 having ends 137 and 139 that is axially mounted in hollow shaft or sleeve 5, and that is connected to the drill press star wheel shaft. Intermediate shaft 135 is freely rotatable in sleeve 5.

End 137 of intermediate shaft 136 is adapted to connect to the end of the star wheel drive shaft emerging from the drill press. Such adaption is shown in FIG. 4 to comprise an axially bored receiving hole 141 in shaft end 137 and cross-bored and threaded set screw anchoring holes 143. Holes 145 are also cross-bored in shaft end 137 in the area of receiving hole 141 through which star wheel spokes may be inserted and attached to the end of the star wheel shaft for manual rotation thereof.

An annular collar 147 surrounds intermediate shaft 135 near flared portion 149 and is threadably engaged thereto at 151. A lip 153 is formed on collar 147 that slidingly engages a complemental gripping lip 155 on sleeve 5. When collar 147 is turned in one direction relative to shaft 135, shaft 137 and sleeve 5 move reciprocally with respect to each other causing first and second clutch plate faces 129 and 133 to engage thus transferring the turning motion of pinion 3 to the star wheel drive shaft. When collar 147 is turned in the opposite direction relative to shaft 135, clutch plate faces 129 and 133 part and the star wheel drive shaft is rotationally (albeit not mechanically) disconnected from the feed unit. A handle 157 may be placed on collar 135 to facilitate engagement and disengagement.

Utilization of adjustable positioning drive means 125 with the drill press feed unit embodiment shown in FIGS. 1, 2 and 3 permits the unit to be operated at any inclination or orientation with respect to the floor upon which the drill press is mounted or with respect to the major axis of the drill press itself. Merely by rotating handle 157, the drill press feed unit is rotationally disengaged from the star wheel shaft. Regardless of the position of the star wheel shaft in its fully retracted state, simple turning of handle 157 will engage it with the drill press feed unit without requiring a change in the inclination or orientation of the feed unit.

Figure 7:
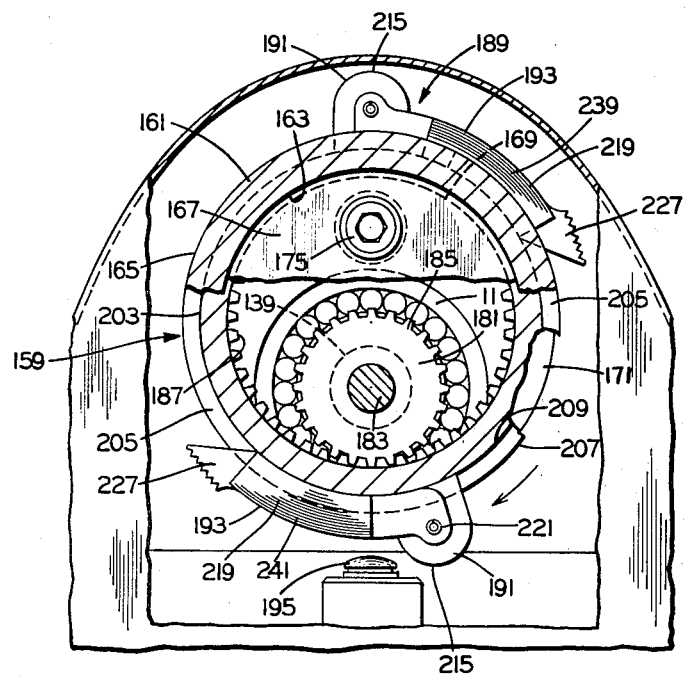
FIG. 7 is a side view, partially in section, taken along the lines 7—7, of embodiment of the cam drum shown in FIG. 4.

As shown in FIGS. 4 & 7, positioned adjacent adjustable positioning drive means 125 and in operable contact therewith is a rotating shaft driven device, generally indicated at 159, for controlling the sequence and duration of the drilling operations (such as start, skip, drill, feed, and retract) as a function of one or more revolutions of intermediate shaft 135. Device 159 generally comprises hollow cylindrical drum 161 having inner and outer surfaces 163 and 165 respectively. Drum 161 is mounted horizontally to rotate about its major cylindrical axis by a hold plate 167 that is mounted perpendicularly across the inside opening of drum 161 and peripherally against a ridge 169 formed about inner surface 163 that forces the bearing end 171 of said drum to ride or slidingly bear against complemental bearing surface 173 on C-shaped channel 33. Hold plate 167 is anchored to C-shaped channel 33 by bolt 175 that is off center through hold plate 167 so as to prevent rotational movement thereof. Hollow cylindrical drum 161 therefore is restrained in a horizontal attitude for rotational movement against complemental bearing surfaces 173.

Intermediate shaft 135 extends through a bushing 177 to form a mounting surface 179 at shaft end 139 for abutting with a drive wheel 181 by use of a bolt 183. Drive wheel 181 is of smaller diameter than hollow cylindrical drum 161 and is positioned in tangential contact with drum inner surface 163 so that one revolution of intermediate shaft 135 produces less than one revolution of drum 161. Drive wheel 181 may contact drum 161 on either its inside or outside surface; shown in FIGS. 4 and 7 is the preferred embodiment because of the space saving feature of placing drive wheel 181 inside drum 161. Drive wheel 181 may contact drum inner surface 163 in any conventional manner; as shown, drive wheel 181 has spaced apart gear teeth 185 formed about the outer surface thereof that are in complemental engagement with a gear race 187 formed about drum inner surface 163. Therefore, the position of cylindrical drum 161 and its movements are a direct mechanical function of the position of intermediate shaft 135 and hence a function of the position of the rotating drill with respect to the work piece positioned therebelow in the drill press to which intermediate shaft 135 is connected. By varying the diameter of drive wheel 181 and the center rotational axis of drum 161, drum 161 may be caused to rotate at different speeds with respect to the rotation of intermediate shaft 135.

Although one drive wheel 181 is shown in the embodiment depicted in FIG. 7, it is contemplated that other changes in rotational motion of drum 161 with respect to intermediate shaft 135 are possible through the use of conventional planetary gear arrangements in drum 161 which generally comprise at least one, but preferably two or more, drive wheels that gear down or reduce and in some cases reverse the relative rotation of cylindrical drum 161 with respect to intermediate shaft 135.

Mounted about outer drum surfaces 165 are cam lobe assemblies, generally indicated at 189, that comprise cam lobes 191 and mounting assemblies 193 therefor. During rotation of drum 161 cam lobes 191 contact cam followers or switches 195, spaced apart from said drum, giving commands that are transferred to rectilinear prime mover means 39 and to hydraulic resistance and poppet valve 73 to actuate various drilling functions such as start, skip, drill feed, retract, etc. Switches 195 are connected by electrical wiring in electrical conduit 197, connecting block 199, conduit 59 and conduit 201 to valves 202 and 51 to actuate rectilinear prime mover means 39 and adjustable hydraulic resistance and poppet valve 73 in predetermined and programmed sequence. Switches 195 may utilize pneumatic or hydraulic power in lieu of electrical power; in such cases, conduits 197, 59 and 201 and connecting block 199 may be replaced with fluid-carrying ducts.

Cam lobe assemblies 189 are mounted in complemental grooves 203 formed in outer drum surface 165. Grooves 203 prevent cam lobe assemblies 189 from moving out of the path necessary to contact cam lobes 191 with spaced apart cam followers or switches 195.

Figure 5A:
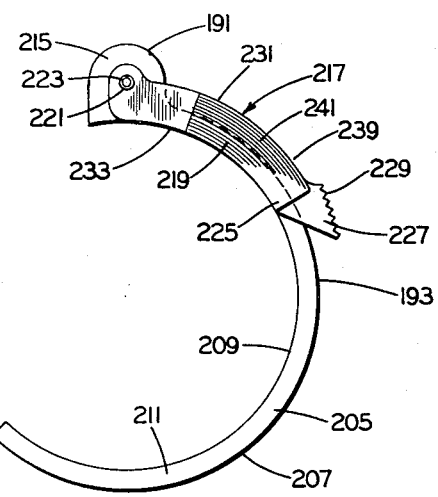
FIGS. 5a and 5b are respectively a side view and an end view of one embodiment of an adjustable cam lobe that may be employed on the cam drum shown in FIGS. 4 and 7.
Figure 5B:
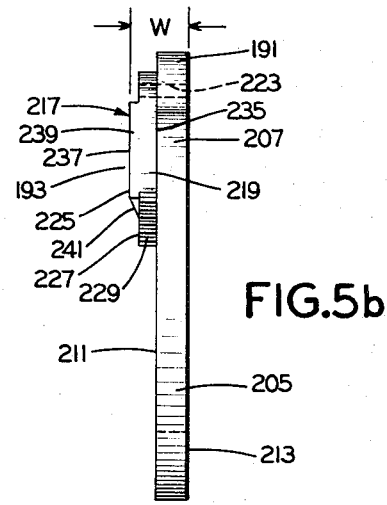

FIGS. 5a and 5b show respectively a side and front view of one embodiment of a combined adjustable cam lobe mounting assembly 193 and a cam lobe 191 for use on outer drum surface 165. Mounting assembly 193 comprises an elongated base 205 curved in the shape of an incomplete circle or span of more than 180°. It is preferred that elongated base 205 traverses (spans) between 220° and 250° of curvature so that it will sustain its position in complemental groove 203 by spring action during adjustment of cam lobes 191. Base 205 is bounded by top and bottom surfaces 207 and 209 respectively and opposing sides 211 and 213 respectively. It is preferred that the cross-sectional shape of base 205 be rectangular; however, other configurations are contemplated. Base 205 is adapted for complemental reception in grooves 203 on outer drum surface 165 in that the "incomplete circular" diameter of base 205 is such that it will snap tightly but slidingly into groove 203. At least one cam lobe 215 is mounted or formed on base top surface 207 for operative contact with a cam follower or switch 195. The height of cam lobe 215, above base top surface 207, is dictated by the distance from outer drum surface 165 to the contact surface of switch 195. The configuration of cam lobe 215 is dictated by the duration of the particular drilling operation desired, i.e., a narrow cam lobe 215 as shown in FIG. 5a may be used to activate a stop or start switch whereas a wider or more elongated lobe would act to cause a more extended operation such as retraction, skipping, etc.

Operatively connected to base 205 is fastening means generally indicated at 217 for holding base 205 tightly in complemental groove 203. Said means 217 comprises an arm 219 that is pivotally mounted at one end 221 to a side (either 211 or 213, or both) of base 205 by a roll pin 223. Arm 219 is curved concentric with base 205 for adjacent nesting therewith, i.e., when arm 219 is placed adjacent base 205, the curves of both members coincide. The non-pivoted end 225 of arm 219 is optionally formed into a tab 227 having serrations 229 on the outermost surface thereof for easy movement of arm 219 when positioning base 205 in complemental groove 203. The radial distance to the top or outermost surface of any portion of arm 219 must be kept less than the radial distance to the switch contacting surface of cam lobe 215 to prevent interference by fastening means 217 with the complemental contacting switch or cam follower. In specialized cases, the cam follower, the contacting switch, or the cam lobe may be positioned such that regardless of the height of any portion of fastening means 217, there would be no interference with these contacting mechanisms; an example of this would be offsetting the contacting mechanism such that it does not overlap the exposed portion of fastening means 217.

Arm 219 is bounded by top and bottom surfaces 231 and 233 respectively and opposing sides 235 and 237. When arm 219 is adjacently nested with elongated base 205, as shown in FIG. 5a, arm bottom surface 233 is coincident with base bottom surface 209 and both are ready for contact with the bottom of complemental groove 203. Also, when in this nesting position, arm side 235 is in contact with base side 211.

On the exposed side of arm 219, i.e., side 237, is mounted a lock 239 adapted for frictional contact with a side of complemental groove 203. As shown in FIG. 5b, lock 239 comprises a wedge-shaped ridge 241 formed on arm side 237 that is tapered toward arm bottom surface 233. The total width W of lock 239, arm 219, and base 205, in adjacent nesting position as shown in FIG. 5a and FIG. 5b, should be minutely greater, i.e., one or two thousandths of an inch, than the width of complemental groove 203 so that when cam lobe mounting assembly 193 is placed in complemental groove 203 and arm 219 is rotated downward into adjacent nesting position with base 205 in groove 203, the slight interference fit occasioned upon the pressing of lock 239 into groove 203 firmly anchors base 205 to drum 161.

Lock 239 may be formed in other configurations such as a spring loaded dimple facing outward of arm side 237 in the direction of lock 239 as shown in FIG. 5a.

Figure 6:
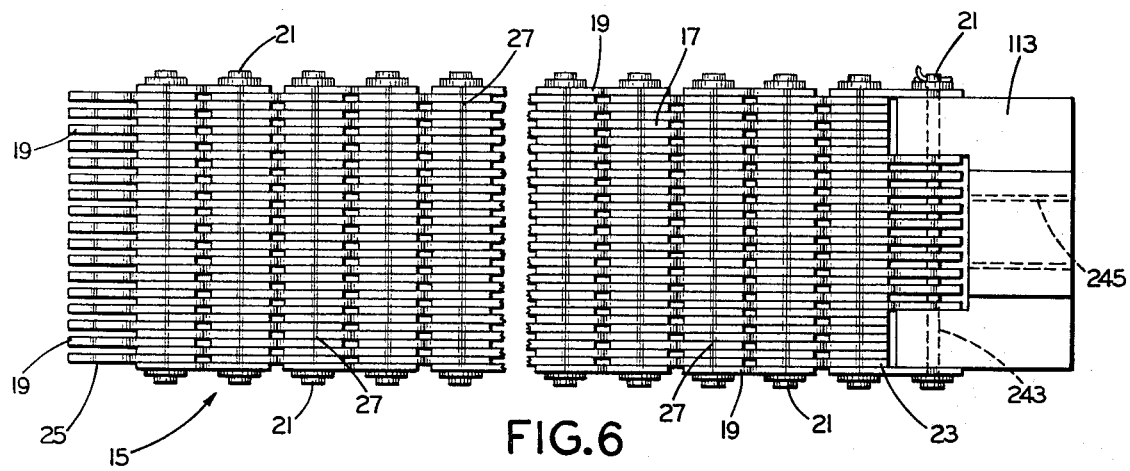
FIG. 6 is a top view of one embodiment of the flexible, non-elastic drive strip that is shown in side view of FIG. 3.

FIG. 6 shows a top view of the embodiment of non-compressible, contained belt 15 that is shown in FIG. 3. In the figure, chain 17 is shown formed of a plurality of links 19 that are joined together in forward and aft staggered directions by pins 21. A chain block 113 is shown at chain end 23 and comprises a C-shaped element that is attached to chain 17 near the outer edges thereof by one of the pins 21 inserted through holes 243 cross-bored therethrough. Centered in chain block 113 is a threaded hole 245 through which piston rod end 43 passes in mating thread relationship.

What is claimed is:
1. A device for deriving bidirectional rotary motion for bidirectional rectilinear motion comprising:
   a. rotary motion transfer means; and,
   b. a substantially non-compressible, non-extendable, discontinuous contained belt in tangential driving contact with said rotary motion transfer means for axial connection with a rectilinear motion device;
   c. said belt having top and bottom surfaces and side edges;
   d. means adjacent the side edges of said belt for containing the top and bottom surfaces of said belt in a fixed configuration and for guiding said belt during movement thereof; and,
   e. whereby during movement of said rectilinear motion device in one direction, the column strength of said belt causes movement of said rotary motion transfer means and during movement of said rectilinear motion device in the opposite direction, the tensile strength of said belt causes opposite movement of said rotary motion transfer means.

2. The device of claim 1 wherein said rotary motion transfer means comprises a rotatably mounted pinion arranged for tangential complemental engagement with said belt.

3. The device of claim 1 wherein said substantially non-compressible belt is a metal chain comprising a plurality of separate chain links attached in end-to-end fashion and having teeth formed on at last one side thereof for complemental engagement with said rotary motion transfer means.

4. The device of claim 1 including bearing and direction changing means adjacent said rotary motion transfer means for placing said belt in increased surface contact with said rotary motion transfer means.

5. The device of claim 4 wherein said bearing and direction changing means comprises a bearing shoe, having a concave surface of a radius substantially equal to the distance from the center of rotation of said rotary motion transfer means to the contact point with said belt, juxtaposed to the belt-containing surface of said rotary motion transfer means to being said belt into extended contact with said rotary motion transfer means and to fold said belt out of the way after contact with said transfer means.

6. The device of claim 1 wherein said means for containing said belt in a fixed configuration and for guiding said belt during movement thereof comprises a pair of channels of fixed configurations mounted in parallel and having concave portions facing each other and enclosing portions of the surfaces of said belt to permit said belt to slide therealong.

7. The feed unit of claim 6 wherein said pair of channels comprises a pair of C-shaped channels.

* * * * *